United States Patent
Umamageswaran et al.

(10) Patent No.: US 7,305,395 B1
(45) Date of Patent: Dec. 4, 2007

(54) CENTRALIZED STORAGE AND MANAGEMENT OF DATABASE PARAMETERS

(75) Inventors: Kothanda Umamageswaran, Mountain View, CA (US); Juan R. Loaiza, Redwood City, CA (US); Sumanta Chatterjee, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 889 days.

(21) Appl. No.: 10/131,357

(22) Filed: Apr. 24, 2002

(51) Int. Cl.
*G06F 17/30* (2006.01)

(52) U.S. Cl. .................. 707/10; 707/1; 707/2

(58) Field of Classification Search ................ 707/203, 707/101, 10, 205; 709/222–226, 203, 213, 709/315; 717/174
See application file for complete search history.

(56) References Cited

U.S. PATENT DOCUMENTS

| | | | |
|---|---|---|---|
| 5,884,311 A * | 3/1999 | Blattmann-Bleile et al. .. | 707/10 |
| 6,059,842 A * | 5/2000 | Dumarot et al. ............ | 717/153 |
| 6,122,664 A * | 9/2000 | Boukobza et al. .......... | 709/224 |
| 6,154,747 A * | 11/2000 | Hunt .............................. | 707/2 |
| 6,223,171 B1 * | 4/2001 | Chaudhuri et al. ............ | 707/2 |
| 6,266,658 B1 * | 7/2001 | Adya et al. .................... | 707/2 |
| 6,453,356 B1 * | 9/2002 | Sheard et al. ................ | 709/231 |
| 6,484,160 B1 * | 11/2002 | Richard et al. ................ | 707/2 |
| 6,487,547 B1 * | 11/2002 | Ellison et al. ................. | 707/2 |
| 6,591,277 B2 * | 7/2003 | Spence et al. .......... | 707/103 R |
| 6,745,332 B1 * | 6/2004 | Wong et al. .................... | 726/4 |
| 6,868,444 B1 * | 3/2005 | Kim et al. ................... | 709/223 |
| 6,912,522 B2 * | 6/2005 | Edgar ............................. | 707/2 |
| 2002/0046204 A1 * | 4/2002 | Hayes ............................ | 707/1 |
| 2002/0087587 A1 * | 7/2002 | Vos et al. .................... | 707/203 |
| 2002/0091702 A1 * | 7/2002 | Mullins ..................... | 707/100 |
| 2003/0009253 A1 * | 1/2003 | McIntyre et al. ........... | 700/108 |
| 2003/0056200 A1 * | 3/2003 | Li et al. ..................... | 717/128 |
| 2003/0065826 A1 * | 4/2003 | Skufca et al. ............... | 709/315 |
| 2003/0105838 A1 * | 6/2003 | Presley ....................... | 709/220 |
| 2003/0200288 A1 * | 10/2003 | Thiyagarajan et al. ...... | 709/221 |

OTHER PUBLICATIONS

Daniel A. Menasce, Daniel Barbara, & Donald Dodge. Presenting QoS of E-commerce Sites Through Self-Tuning: A Performance Model Approach.George Mason University, Fairfax, VA. ACM, Oct. 14-17.*

Stefan Pommernek, & Lars Klevan. Oracle8i (tradmark) Parallel Server: Oracle Applications R11.03 on Windows NT-Tuning and Best Practices. Technical White Paper, Mar. 2000.*

Michael Gillmann, Ralf Mindermann, Gerhard Weikum. Benchmarking and Configuration of Workflow Management Systems. University of teh Saarland. Information system International Conference 2000.*

(Continued)

*Primary Examiner*—Neveen Abel-Jalil
(74) *Attorney, Agent, or Firm*—Aka Chan LLP

(57) ABSTRACT

Techniques for the centralized storage and management of parameters for databases are provided. Configuration parameters for instances of a database server can be stored centrally and associated with the appropriate instance. Additionally, configuration parameters that are modified during run time of the instance can be stored so that subsequent instances can be initialized using those configuration parameters, which can result in new instances that are tuned for the environment.

26 Claims, 7 Drawing Sheets

OTHER PUBLICATIONS

Chaudhuri, et al. Self-Tuning Technology in Microsoft SQL Server. Microsoft Corp. IEEE 1999.*

Chapter 4: Overview of Diagnostic Tools. Oracle Tuning Release 8.0 A58246-01. Retrieved from Oracle Website Feb. 4, 2007.*

Christopher R. Page. Millennium Pharmaceuticals. For USENIX Association. Configuring Database Systems. Paper pub. in the LISA'98 Proceedings. Dec. 1998. Retrieved from the Web Feb. 4, 2007.*

Fangzhe Chang and Vijay Karamcheti. Dpt. of Computer Science. Automatic Configuration and Run-Time Adaptation of Distributed Application. IEEE 2000.*

John.H. Miller and Henry Lau. Microsoft SQL Server 2000 RDBMS Performance Tuning Guide for Data Warehousing. Pub. Jun. 2001.*

Gaja Krishna Vaidyanatha. Oracle Database Performance Management. Quest Software. White Paper. Pub. 1999.*

\* cited by examiner

CENTRALIZED STORAGE AND MANAGEMENT OF DATABASE PARAMETERS

BACKGROUND OF THE INVENTION

The present invention relates to storage of parameters for database server instances. More specifically, the invention relates to centralized storage and management of database server configuration parameters.

In general, a database management system (DBMS) is the computer software that controls the organization, storage, retrieval, security, and integrity of information in a database. Early database management systems operated on a single computer system. However, as the need for greater access, faster retrieval and increased storage continued, it became more and more common for database management systems to be operated on a network of computer systems.

A fairly common database management system architecture is the three-tiered architecture that is shown in FIG. 1. At the core of the database management system is a central storage 101 that stores a database 102. Database 102 is typically stored on one or more hard drives, which is typically part of a larger computer system. The information can be stored on database 102 in a variety of formats with relational database management systems relying heavily on tables to store the information.

Database servers 103 are instances of a program that interacts with database 102. Each instance of the database server can, among other things, independently query database 102 and store information therein. Database servers 103 may not include user friendly interfaces, such as graphical user interfaces.

Accordingly, one or more application server 105 can provide the user interfaces to database server 103. For example, application server 105 can be a web application server on the Internet (or other network). Application server 105 can provide user friendly mechanisms for accessing database 101 through database server 103. A web browser 107 can be utilized to access application server 105.

Although the architecture shown in FIG. 1 has been very successful, current implementations can be improved. One improvement relates to the storage of configuration parameters.

In order to start or initialize a database server, a file is typically accessed that stores configuration parameters for the database server (e.g., init.ora files for Oracle® database products). Each instance of database server 103 has its own configuration file, which results in database administrators spending a significant amount of time managing the multiple configuration files.

Another improvement to current database architectures relates to self-tuning. During run time, instances of database server 103 can modify configuration parameters to improve the run time characteristics of the instance. In this manner, the instances of database server 103 become more optimized while they execute. However, once an instance is shut down (e.g., for maintenance or a crash), the self-tuned configuration parameters are lost and the new instance starts with the default configuration parameters or parameters from a configuration file. Thus, each instance may be required to go through the self-tuning process and not benefit from previous instances.

Additionally, configuration parameters for a running instance typically cannot be changed from another running instance. Changing the configuration parameters for a running instance may require logging into the appropriate instance and changing the appropriate configuration parameters. Furthermore, changing the configuration parameters for an instance for the next startup has typically required locating the configuration file for that specific instance and modifying that file. In order to perform a coordinated change of one or more configuration parameters on all instances sometimes requires changing the configuration files for each instance, which can be very time consuming.

It would be beneficial to have improved techniques for the storage and management of database configuration parameters. As an example, it would be beneficial to allow for the centralized storage of configuration parameters for multiple instances of the database server. Additionally, it would be beneficial to have techniques for storing configuration parameters that have been modified while an instance is running so that the configuration parameters can be utilized by a subsequent instance.

SUMMARY OF THE INVENTION

The present invention provides innovative techniques for the centralized storage and management of configuration parameters for databases. In general, configuration parameters for multiple instances of the database server can be stored together (or centrally) associated with the appropriate instance. Additionally, configuration parameters that are modified during run time of the instance can be stored for subsequent use by other instances. Techniques can also be provided to allow configuration parameters to be sent between instances and updates to configuration parameters that apply to all instances. Some specific embodiments of the invention are described below.

In one embodiment, the invention provides a method of storing configuration parameters for instances of a database server. Multiple configuration parameters for the instances of the database server are stored together. Each of the configuration parameters are associated with an instance of the database server. In some embodiments, the configuration parameters specify run time characteristics of the instances of the database server.

In another embodiment, the invention provides a method of storing configuration parameters for instances of a database server. An instance of the database server periodically modifies a configuration parameter during run time of the instance in order to improve a run time characteristic of the instance. The configuration parameter is stored and upon initialization, a new instance retrieves the configuration parameter that was previously modified by a previous instance. In some embodiments, the configuration parameter is stored in a file on a central storage.

Other features and advantages of the invention will become readily apparent upon review of the following description in association with the accompanying drawings, where the same or similar structures are designated with the same reference numerals.

DETAILED DESCRIPTION OF PREFERRED EMBODIMENTS

In the description that follows, the present invention will be described in reference to embodiments that are utilized in a three-tiered database architecture. However, embodiments of the invention are not limited to any particular architecture, environment, application, or implementation. For example, although the three-tiered database architecture has been described, the invention may be advantageously applied to other architectures, including those with fewer or more tiers. Therefore, the description of the embodiments that follows is for purposes of illustration and not limitation.

Figure 2:
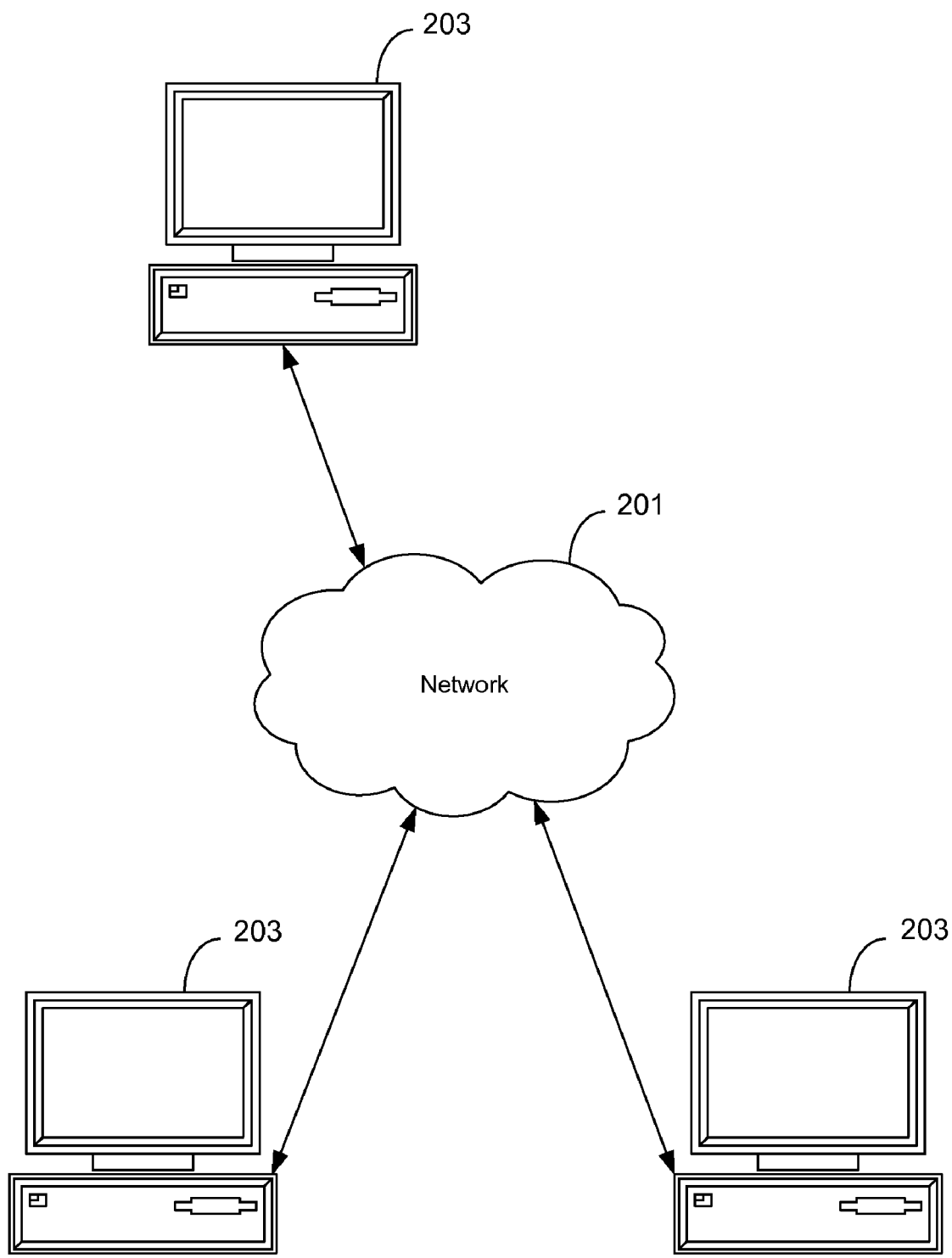
FIG. 2 shows a network providing communication between and among multiple computer systems.

FIG. 2 shows an example of a network that facilitates communication between multiple computer systems. As shown, network 201 allows communication between computer systems 203. Network 201 can be a wide area network (such as the Internet), a local area network or any combination of the two.

Typically, in large database management systems different computer systems are utilized to implement the application servers, database servers and database. However, it is not required that each of these components be implemented on a different computer system. Therefore, the present invention is not to be limited by the description of the database architecture described herein.

Figure 3:
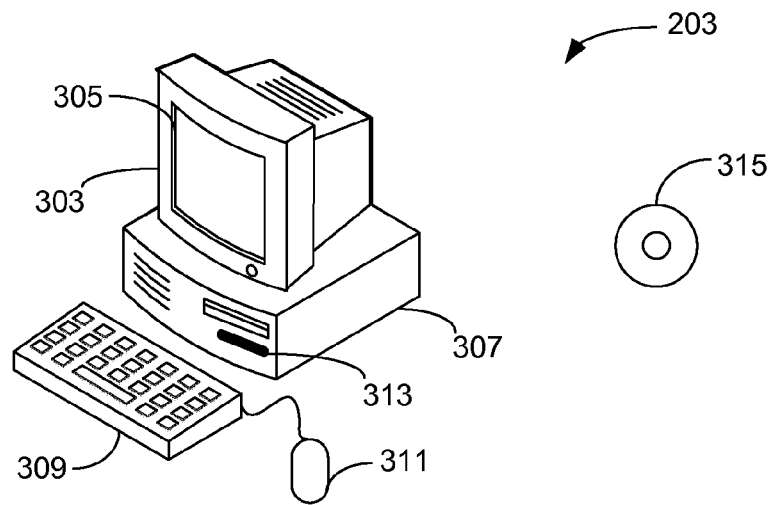
FIG. 3 illustrates an example of a computer system that can be utilized in association with embodiments of the invention.

FIG. 3 illustrates an example of a computer system that can be used in association with embodiments of the invention. FIG. 3 shows computer system 203 that includes a display 303, screen 305, cabinet 307, keyboard 309, and mouse 311. Mouse 311 can have one or more buttons for interacting with a graphical user interface. Cabinet 307 houses a CD-ROM drive 313, system memory and a hard drive (see FIG. 4), which can be utilized to store and retrieve software programs incorporating computer codes that implements the invention, data for use with the invention, and the like. Although CD-ROM 315 is shown as an exemplary computer readable storage medium, other computer readable storage media including floppy disk, tape, flash memory, system memory, and hard drives can be utilized. Additionally, a data signal embodied in a carrier wave (e.g., in a network including the Internet) can be the computer readable storage medium.

Figure 4:
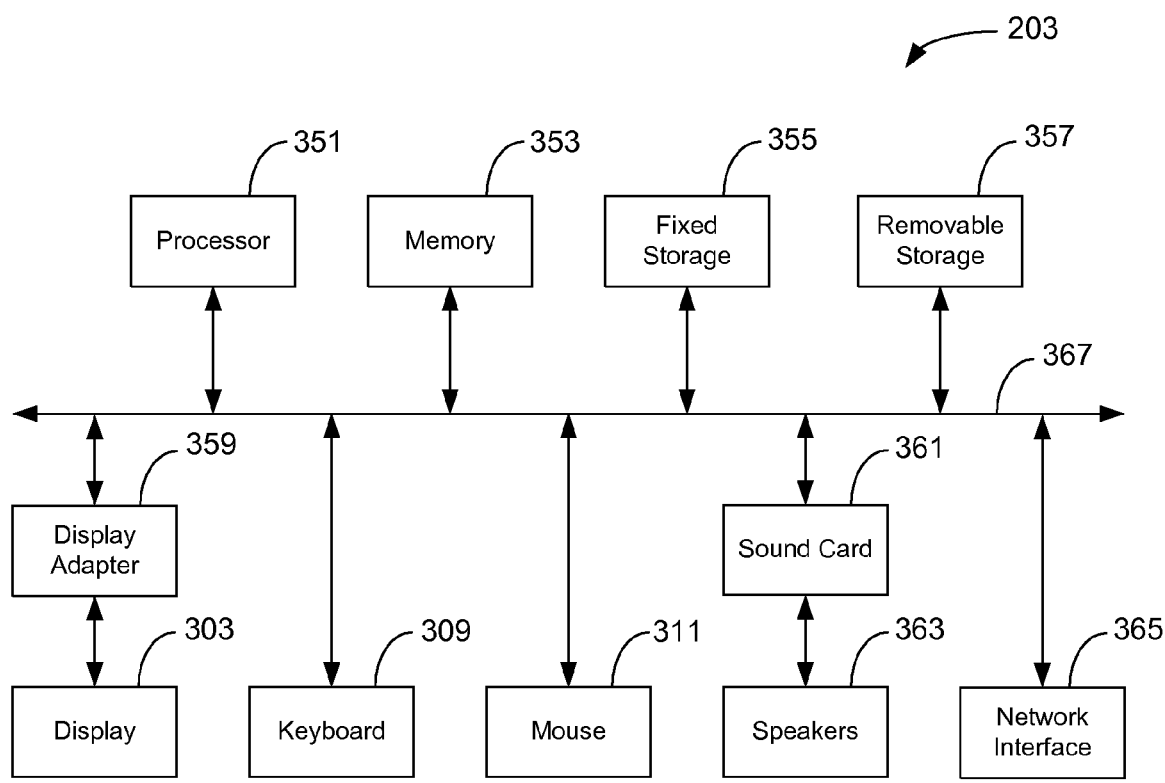
FIG. 4 illustrates a system block diagram of the computer system of FIG. 3.

FIG. 4 shows a system block diagram of computer system 203. As in FIG. 3, computer system 203 includes display 303, keyboard 309 and mouse 311. Computer system 203 further includes subsystems such as a central processor 351, system memory 353, fixed storage 355 (e.g., hard drive), removable storage 357 (e.g., CD-ROM drive), display adapter 359, sound card 361, speakers 363, and network interface 365. Other computer systems suitable for use with the invention can include additional or fewer subsystems. For example, another computer system could include more than one processor 351 (i.e., a multi-processor system) or a cache memory.

The system bus architecture of computer system 203 is represented by arrows 367. However, these arrows are illustrative of any connection scheme serving to link the subsystems. For example, a local bus could be utilized to connect processor 351 to memory 353 and display adapter 359. Computer system 203 shown in FIG. 4 is but an example of a computer system suitable for use with the invention. Other computer architectures having different configurations of subsystems can also be utilized.

Figure 1:
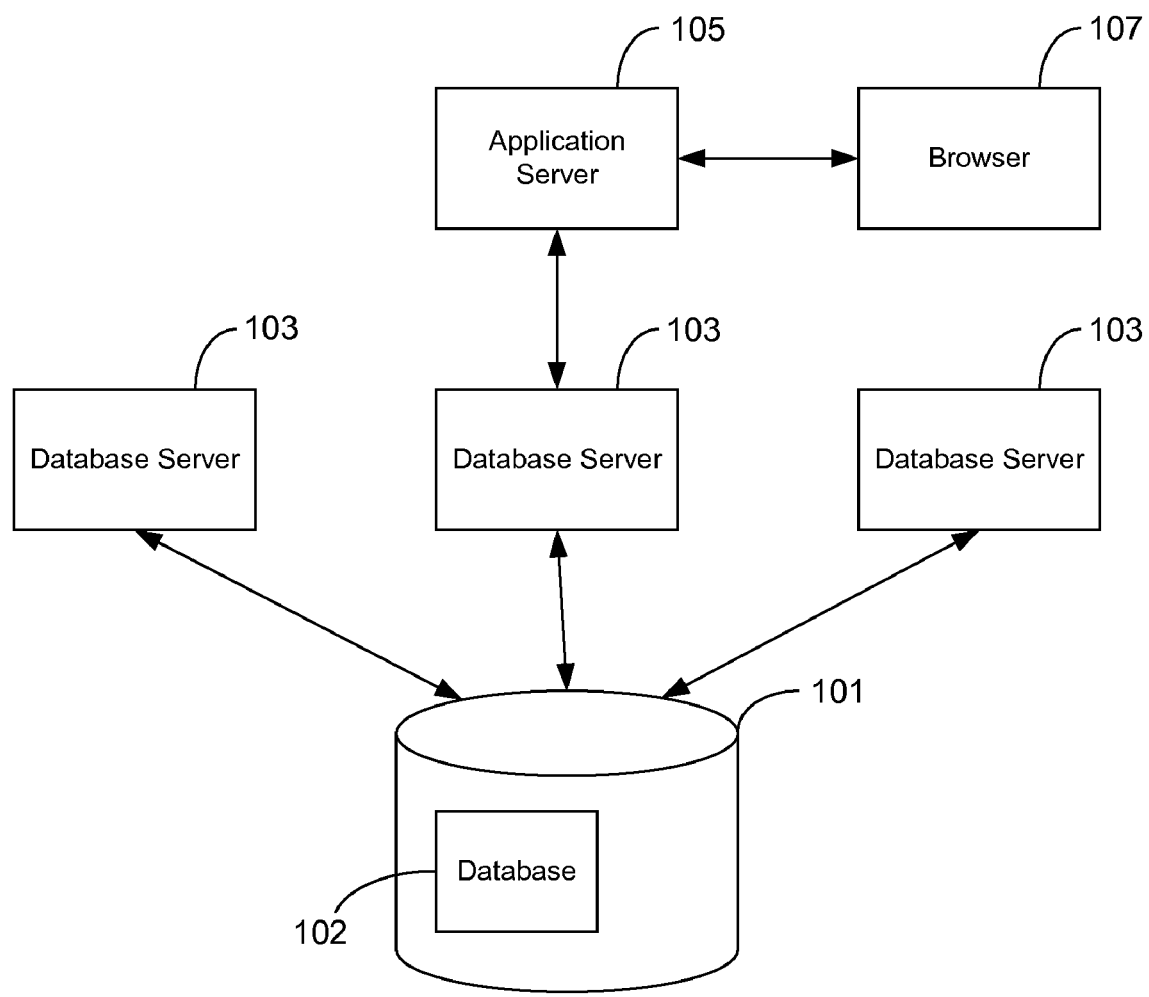
FIG. 1 shows an example of a three-tiered architecture for a database management system.
Figure 5:
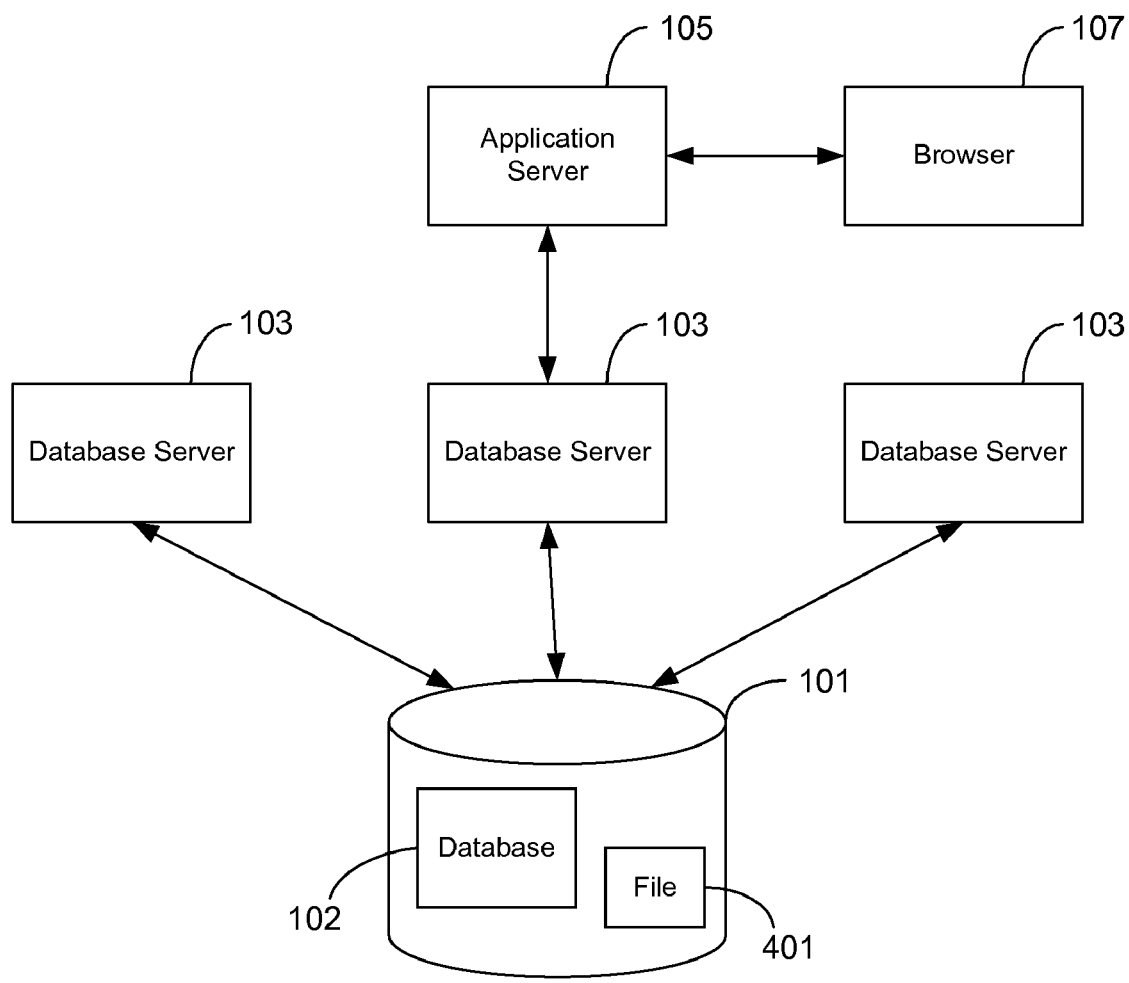
FIG. 5 shows an example of three-tiered architecture for a database management system incorporating an embodiment of the invention.

FIG. 5 shows an example of a three-tiered database architecture incorporating an embodiment of the invention. As described in reference to FIG. 1, a database 102 is accessed by multiple database servers 103 through an application server 105. A user communicates with application server 105 through a browser 107. Although only one application server 105 and browser 107 are shown, typical environments include multiple copies of these components.

In conventional database management systems, the configuration parameters for the instances of the database server 103 are stored locally on the computer system executing the instance. For example, each instance of the database server 103 may have the cache size specified in a configuration file. Thus, if the cache size is 20 megabytes, the configuration file may include the following line:

Cachesize=20;

where the cache size is specified in megabytes. For the three instances of the database server 103 that are shown, there would typically be three configuration files that specify potentially three different cache sizes.

The embodiment shown in FIG. 5 instead stores these configuration parameters in a configuration file 401 on central storage 101. In this manner, the configuration parameters are stored centrally in one location. As an example, the cache size for the three instances of the database server 103 could be specified by the following:

Instance1.cachesize=20;
Instance2.cachesize=30;
Instance3.cachesize=10;

where InstanceX typically represents the session identifier of the instance. Thus, the configuration parameters are associated with the instance of the database server that is appropriate. In addition to cache size, other configuration parameters including the shared pool size and others can be specified in configuration file 401.

Typically, before an instance of the database server 103 begins executing, the database administrator specifies the configuration parameters for the new instance in configuration file 401. The session identifier uniquely identifies the appropriate instance to which the configuration parameter should be associated. Upon start up, a new instance can retrieve its configuration parameters from configuration file 401 on central storage 101, which are stored in configuration file 401.

As described, configuration file 401 stores configuration parameters for multiple instances of the database server 103 together. In some embodiments, configuration parameters that do not have an associated session identifier are global configuration parameters for all instances. Additionally, configuration parameters that are modified during run time (e.g., self-tuning) can be stored in configuration file 401.

By storing configuration parameters that are modified during run time of an instance in configuration file 401, a subsequent instance can be initialized that begins execution with the configuration parameters of the previous instance. In other words, if it takes three hours for an instance of the database server 103 to become self-tuned, then a new instance can be initialized that is already self-tuned and it will not be required to spend the three hours for tuning. This can result in much more efficient database operation.

As shown in FIG. 5, there can be communication between the instances of the database server 103. In this manner, configuration parameters can be sent to another instance so that the instance can use the new configuration parameter. Additionally, a configuration parameter can be stored in configuration file 401 and associated with another instance. In this manner, if this instance is reinitialized, the instance will retrieve and utilize the new configuration parameter. Thus, configuration parameters can be sent to an instance to effect how the instance currently executes, stored in configuration file 401 to affect execution characteristics of future instances and a combination of both in order to affect current and future execution characteristics of the instance.

As described above, if a database administrator desired to change a configuration parameter for all the instances of the database server 103, she would typically need to change the configuration parameter in each configuration file for all of the instances. With an embodiment of the invention, the database administrator can access one configuration file, configuration file 401, and change the configuration parameter for all the instances. Depending on the format of configuration file 401, changing a configuration parameter for all the instances may only require modification of one entry or multiple entries. Although configuration file 401 is being described herein as a text file, the information may be stored in any format. Additionally, although the configuration parameters are shown stored on the same storage device as the database, the configuration parameters can be stored together on other storage devices (e.g., on one of the database servers).

In some embodiments, in order to assist the database administrator in managing the configuration parameters, facilities are provided that allow conversion of configuration files that are stored locally with the instances of the database server 103 to and from configuration file 401 that is stored remotely on database 101. Since the configuration parameters for multiple instances of the database server are stored centrally in configuration file 401, it is easier to backup the configuration parameters for all instances at a specific point in time.

Figure 6:
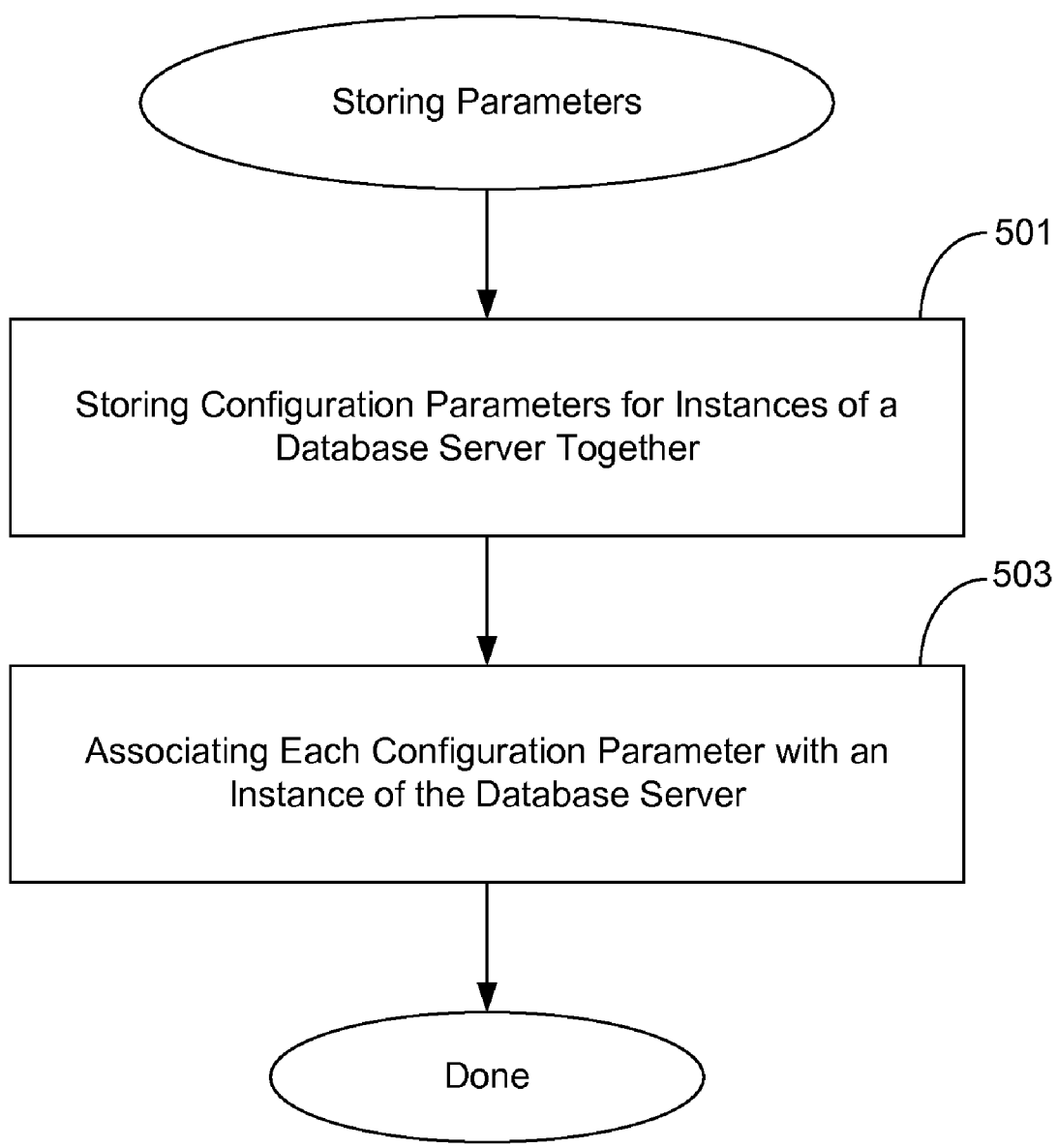
FIG. 6 shows a flowchart of a process of storing configuration parameters for instances of a database server.

Now that an exemplary database architecture has been described it may be beneficial to describe methods of some embodiments of the invention. FIG. 6 shows a flowchart of a process of storing parameters. As with all the flowcharts herein, steps may be deleted, added, reordered, and combined without departing from the spirit and scope of the invention.

At a step 501, configuration parameters for instances of a database server are stored together. As described above, typically the configuration parameters are stored on a central storage that is remote to the instances.

Each configuration parameter is associated with an instance of the database server at a step 503. The configuration parameters can be associated with an instance in any number of ways known in the art. In some embodiments, the configuration parameters are associated with an instance by utilizing the session identifier of the instance in conjunction with the configuration parameter name. In this manner, configuration parameters for multiple instances can be stored centrally in one location, such as a configuration file on a central storage.

Figure 7:
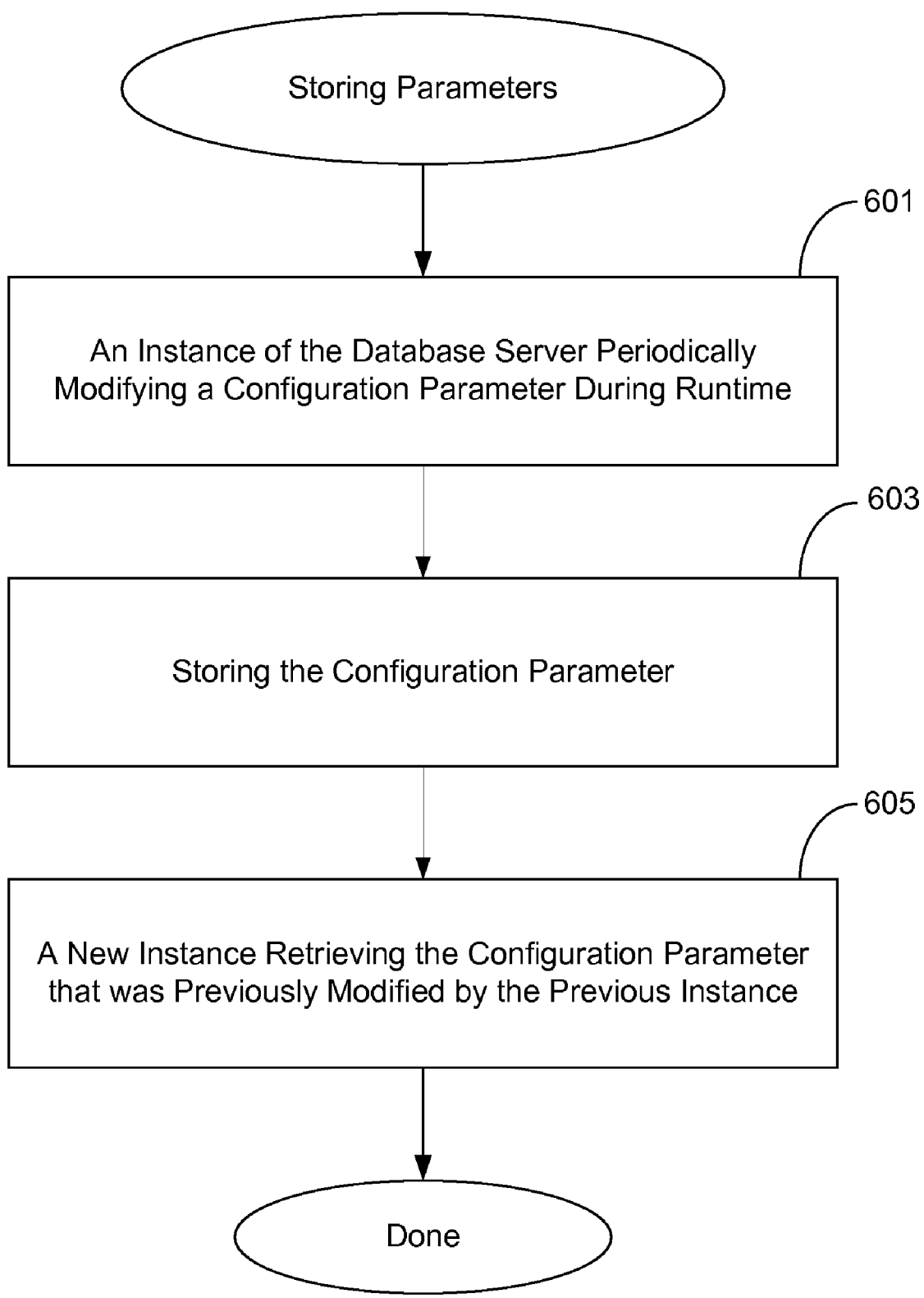
FIG. 7 shows a flowchart of a process of storing a configuration parameter so that a new instance of the database server can utilize a configuration parameter that was modified by a previous instance.

FIG. 7 shows a flowchart of a process of storing configuration parameters. At a step 601, an instance of the database server periodically modifies a configuration parameter during run time. The configuration parameter typically specifies a run time characteristic of the instance of the database server. As described above, the configuration parameter can be the cache size, shared pool size, and the like.

The configuration parameter may be modified a number of different ways. For example, in some embodiments the database administrator determines that an instance may be better optimized by changing the configuration parameter. Then, the database administrator can have the configuration parameter modified accordingly during run time. In other embodiments, the instance itself can analyze its own run time characteristics and according to the results, the instance can modify a configuration parameter to better optimize its performance. For example, the instance can analyze performance data over a specified interval in order to better optimize the instance for the current demands on the instance. In this manner, an instance may be configured one way during peak service hours and another way during relatively slower hours.

As described above, the configuration parameters may be modified during run time as specified by a database administrator or the instance itself. In some embodiments, the configuration parameters can be modified utilizing both techniques. For example, the database administrator may specify that certain configuration parameters can only be modified by a database administrator yet it may be specified that other configuration parameters may be modified during run time by the instance. In this manner, the database administrator is given great flexibility on controlling the performance of the instances of the database server.

Returning again to FIG. 7, the configuration parameter is stored at a step 603. Typically, the configuration parameter is stored on a central storage with the database.

At a step 605, a new instance retrieves the configuration parameter that was previously modified by the previous instance. Thus, as an instance becomes better tuned for performance, a configuration parameter that was modified during run time to enhance the performance of the instance can be stored so that a subsequent instance can benefit from the tuning of the previous instance. A significant advantage of this process is that instances can be initialized that are tuned for the environment and it is not necessary for the new instance to take the time to tune itself (or be tuned by a database administrator). This also allows the new instance to begin fine tuning so the new instance can quickly achieve a very high level of performance.

Figure 8:
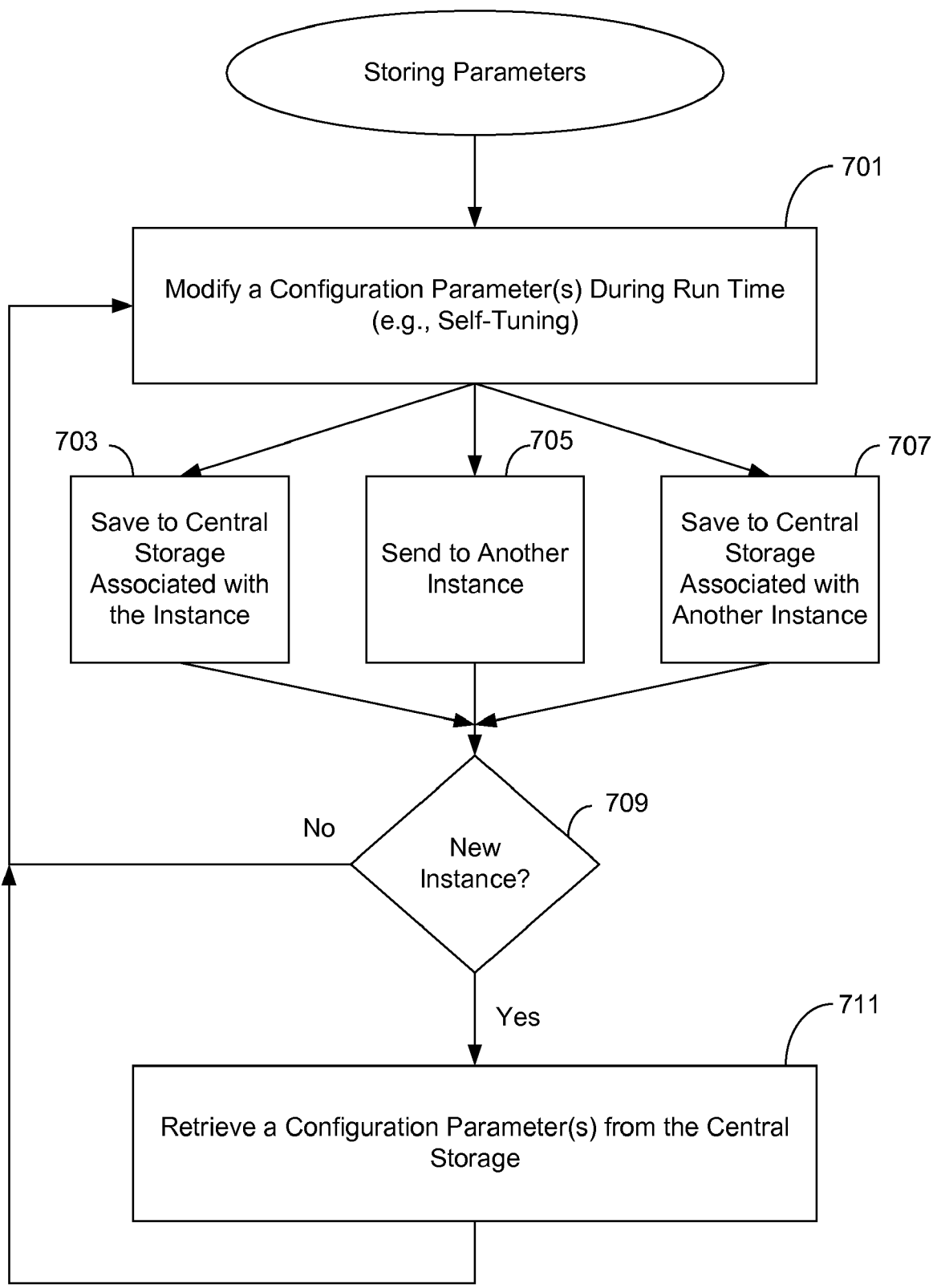
FIG. 8 shows a flowchart of a process of storing and sharing configuration parameters that were modified during run time for use by instances of the database server.

FIG. 8 shows a flowchart of a process of storing configuration parameters that have been modified during run time. At a step 701, one or more configuration parameters of an instance of the database server is modified during run time. The configuration parameters can be modified through self-tuning of the instance or through the actions of a database administrator. One or more of steps 703, 705 and 707 can then be performed as follows.

The configuration parameter can be saved to a central storage associated with the instance at a step 703. By saving the configuration parameter associated with the instance, subsequent instances can immediately benefit from this modification when they are initialized.

The configuration parameter can be sent to another instance at a step 705. By sending the configuration parameter to another instance the run time characteristics of the other instance can be changed in order to achieve better performance. At a step 707, the configuration parameter can be saved to the central storage associated with another instance. In this manner, step 705 allows the run time characteristics of an instance to be immediately affected but does not necessarily affect future instances. Step 707 may not necessarily affect the current run time characteristics of the other instance, but will affect future instances. As will be readily apparent to one of skill in the art, in some circumstances it may be advantageous to perform steps 705 and 707 in conjunction.

As discussed above, steps 703, 705 and 707 can be performed by a database administrator or by the instance itself. Also the mechanism for these steps may depend on the configuration parameter and/or how the database administrator has set up the configuration parameter.

At a step 709, it is determined whether there is a new instance to be initialized. As will be readily understood, the flowchart in FIG. 8 represents steps that may be performed by the database administrator, the instance of the database server or both. Thus, the flowchart does not necessarily represent the flow of a single instance.

If it is determined at a step 709 that a new instance should be initialized, one or more configuration parameters is retrieved from the central storage. In this manner the new instance receives configuration parameters that were previously modified by a previous instance during run time. Thus, the new instance can immediately get the benefit of the configuration parameters of the previous instance.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A computer-implemented method of storing configuration parameters for multiple instances of a database server comprising:
    storing a plurality of configuration parameters for each instance of the database server together at a storage location;
    identifying demands on each instance of the database server, wherein the plurality of configuration parameters are periodically modified based on the identified demands during runtime of each instance of the database server, thus improving the runtime characteristics of each instance of the database server; and
    associating each of the configuration parameters stored together at the storage location with an instance of the database server, wherein a first instance receives a configuration parameter modified by a second instance of the database server.

2. The computer-implemented method of claim 1 wherein upon receipt, the first instance utilizes the modified configuration parameter from the second instance to specify a runtime characteristic of the first instance.

3. The computer-implemented method of claim 1 wherein the plurality of configuration parameters for the instances are stored in a file at the storage location.

4. The computer-implemented method of claim 1 wherein the configuration parameters specify runtime characteristics of the instances of the database server.

5. The computer-implemented method of claim 1 wherein upon initialization, a new instance retrieves a configuration parameter from the database server.

6. A computer-implemented method of storing configuration parameters for multiple instances of a database server comprising:
    storing a plurality of configuration parameters for each instance of the database server together at a storage location;
    identifying demands on each instance of the database server, wherein the plurality of configuration parameters are periodically modified based on the identified demands during runtime of each instance of the database server;
    associating each of the configuration parameters stored together at the storage location with an instance of the database server; and
    an instance of the database server storing a configuration parameter of an other instance of the database server.

7. The computer-implemented method of claim 6 wherein the other instance periodically retrieves the configuration parameter and utilizes the configuration parameter to specify a runtime characteristic of the other instance.

8. The computer-implemented method of claim 6 wherein when the plurality of configuration parameters are periodically modified based on the identified demands during runtime of each instance of the database server, the runtime characteristics of each instance of the database server are improved.

9. A computer-implemented method of storing configuration parameters for multiple instances of a database server comprising:
    storing a plurality of configuration parameters for each instance of the database server together at a storage location;
    identifying demands on each instance of the database server, wherein the plurality of configuration parameters are periodically modified based on the identified demands during runtime of each instance of the database server; and
    associating each of the configuration parameters stored together at the storage location with an instance of the database server, wherein each of the configuration parameters is associated using a session identifier of the instance.

10. The computer-implemented method of claim 9 wherein when the plurality of configuration parameters are periodically modified based on the identified demands during runtime of each instance of the database server, the runtime characteristics of each instance of the database server are improved.

11. A computer-implemented method of storing configuration parameters for multiple instances of a database server comprising:
    storing a plurality of configuration parameters for each instance of the database server together at a storage location;
    identifying demands on each instance of the database server, wherein the plurality of configuration parameters are periodically modified based on the identified demands during runtime of each instance of the database server; and
    associating each of the configuration parameters stored together at the storage location with an instance of the database server, wherein the plurality of configuration parameters are periodically stored in a database and upon initialization, a new instance retrieves a configuration parameter from the database that was previously modified during runtime of a previous instance.

12. The computer-implemented method of claim 11 wherein when the plurality of configuration parameters are periodically modified based on the identified demands during runtime of each instance of the database server, the runtime characteristics of each instance of the database server are improved.

13. A computer-implemented method of storing configuration parameters for multiple instances of a database server comprising:
   identifying a demand on an instance of the database server, the instance of the database server periodically modifying a configuration parameter based on the identified demand during runtime of the instance of the database server;
   storing the configuration parameter at a storage location; and
   upon initialization, a new instance of database server retrieving the configuration parameter from the storage location that was previously modified by a previous instance,
   wherein the configuration parameter is stored associated with the instance, and
   the configuration parameter is associated using a session identifier of the instance.

14. The computer-implemented method of claim 13 wherein when the instance of the database server periodically modifies a configuration parameter based on the identified demand during runtime of the instance of the database server, a runtime characteristic of the instance of the database server is improved.

15. A computer-implemented method of storing configuration parameters for multiple instances of a database server comprising:
   identifying a demand on an instance of the database server, the instance of the database server periodically modifying a configuration parameter based on the identified demand during runtime of the instance of the database server;
   storing the configuration parameter at a storage location; and
   upon initialization, a new instance of database server retrieving the configuration parameter from the storage location that was previously modified by a previous instance,
   wherein the configuration parameter is stored associated with the instance, and
   the configuration parameter is periodically stored.

16. The computer-implemented method of claim 15 wherein when the instance of the database server periodically modifies a configuration parameter based on the identified demand during runtime of the instance of the database server, a runtime characteristic of the instance of the database server is improved.

17. A computer-implemented method of storing configuration parameters for multiple instances of a database server comprising:
   identifying a demand on an instance of the database server, the instance of the database server periodically modifying a configuration parameter based on the identified demand during runtime of the instance of the database server, improving a runtime characteristic of the instance of the database server;
   storing the configuration parameter at a storage location;
   upon initialization, providing a new instance to retrieve the configuration parameter from the storage location that was previously modified by a previous instance; and
   the instance sending the configuration parameter to an other instance of the database server.

18. The computer-implemented method of claim 17 wherein upon receipt, the other instance utilizes the configuration parameter to specify a runtime characteristic of the other instance.

19. A computer-implemented method of storing configuration parameters for multiple instances of a database server comprising:
   identifying a demand on an instance of the database server, the instance of the database server periodically modifying a configuration parameter based on the identified demand during runtime of the instance of the database server;
   storing the configuration parameter at a storage location;
   upon initialization,
   a new instance of database server retrieving the configuration parameter from the storage location that was previously modified by a previous instance; and
   any of the database server instances storing the configuration parameter associated with an other instance of the database server.

20. The computer-implemented method of claim 19 wherein the other instance periodically retrieves the configuration parameter and utilizes the configuration parameter to specify a runtime characteristic of the other instance.

21. The computer-implemented method of claim 19 wherein when the instance of the database server periodically modifies a configuration parameter based on the identified demand during runtime of the instance of the database server, a runtime characteristic of the instance of the database server is improved.

22. A computer-implemented method of storing configuration parameters for multiple instances of a database server comprising:
   storing a plurality of configuration parameters for each instance of the database server together at a storage location;
   identifying demands on each instance of the database server, wherein the demands are current demands and the plurality of configuration parameters are periodically modified based on the identified demands during runtime of each instance of the database server, thus improving the runtime characteristics of each instance of the database server; and
   associating each of the configuration parameters stored together at the storage location with an instance of the database server.

23. The computer-implemented method of claim 22 wherein the configuration parameters specify runtime characteristics of the instances of the database server.

24. The computer-implemented method of claim 22 wherein upon initialization, a new instance retrieves a configuration parameter from the database server.

25. The computer-implemented method of claim 22 wherein a first instance sends a configuration parameter to a second instance of the database server.

26. The computer-implemented method of claim 25 wherein upon receipt, the second instance utilizes the configuration parameter from the first instance to specify a runtime characteristic of the second instance.

* * * * *